March 5, 1968     T. RITZ, JR     3,371,976

AUTOMOTIVE STEREO CARTRIDGE HOLDER

Filed June 21, 1966     2 Sheets-Sheet 1

INVENTOR
THEODORE RITZ, JR.
BY William L. Fisher
HIS ATTORNEY

March 5, 1968  T. RITZ, JR  3,371,976
AUTOMOTIVE STEREO CARTRIDGE HOLDER
Filed June 21, 1966  2 Sheets-Sheet 2

INVENTOR
THEODORE RITZ, JR.
BY William L. Fisher
HIS ATTORNEY

United States Patent Office 3,371,976
Patented Mar. 5, 1968

3,371,976
AUTOMOTIVE STEREO CARTRIDGE HOLDER
Theodore Ritz, Jr., 9939 Deering, Livonia, Mich. 48150
Filed June 21, 1966, Ser. No. 559,174
7 Claims. (Cl. 312—245)

ABSTRACT OF THE DISCLOSURE

An automotive stereo cartridge holder is disclosed for use in an automobile passenger compartment which is closed except at the front thereof and which has a retainer bar dividing the front opening into a top front opening through which stereo cartridges are inserted into said holder and into a bottom front opening through which stereo cartridges are removed from said holder, and lift-over stop means preventing movement forwardly out of the holder of the lowermost stereo cartridge, and the retainer bar preventing such forward movement of the other stacked stereo cartridges stored in said holder.

---

Figure 1:
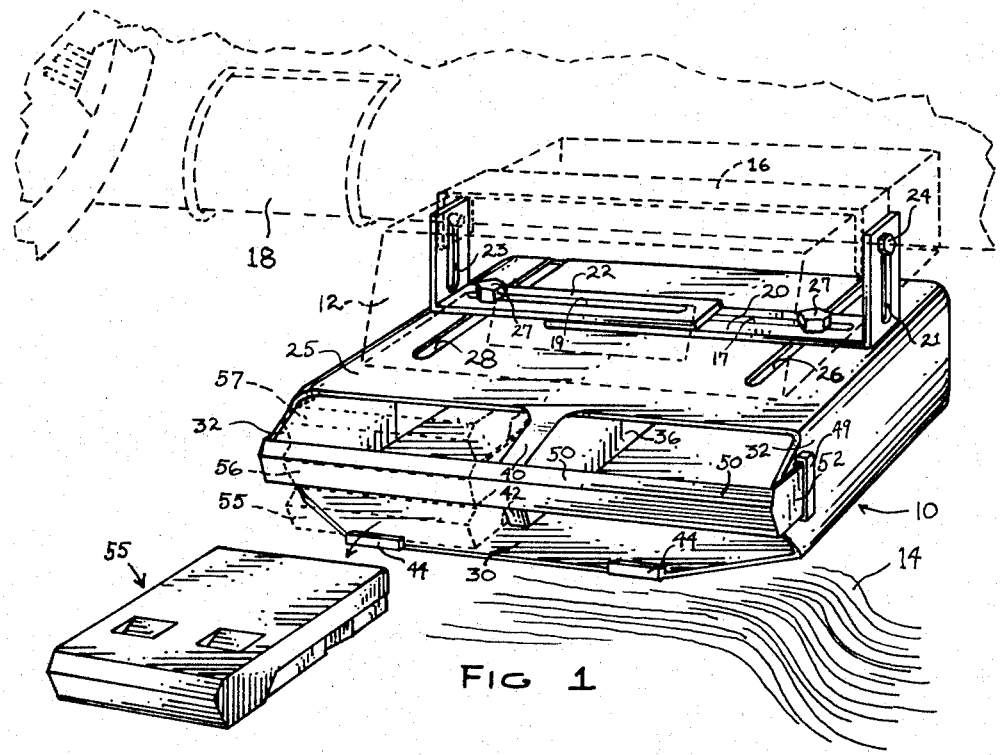
Figures 2, 8, 9:
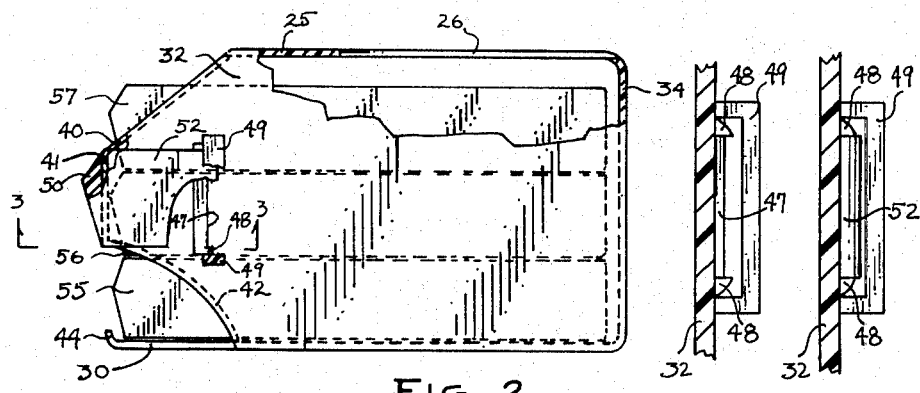
Figure 3:
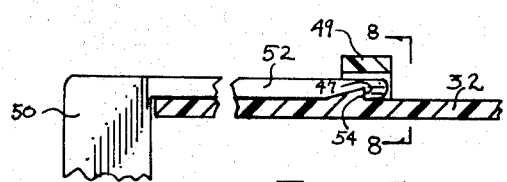
Figure 4:
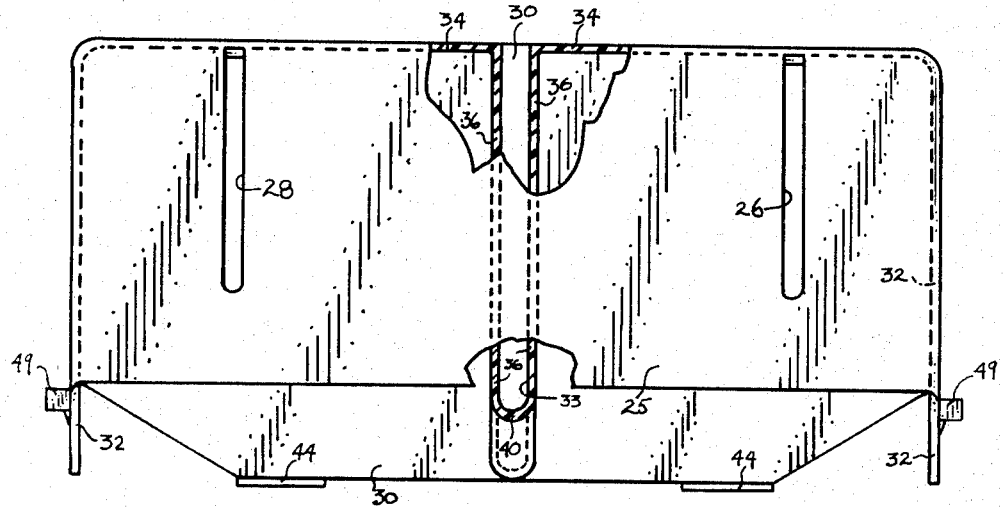
Figure 5:
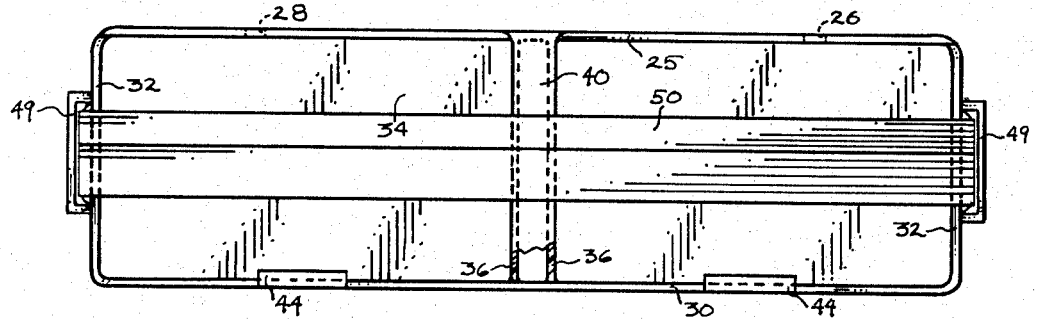
Figure 6:
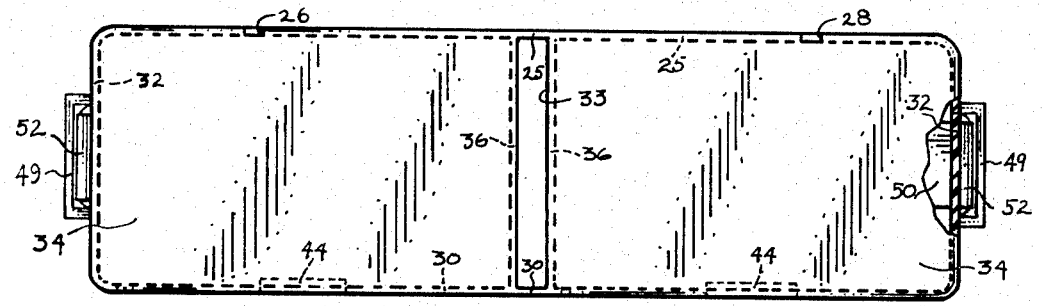
Figure 7:
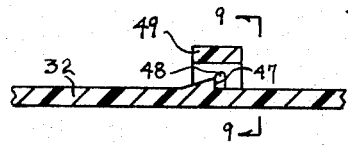

My invention relates to means for holding stereo cartridges in automobile passenger compartments.

Optional equipment on new automobiles today is a stereo playback unit which receives by insertion a stereo cartridge containing an endless loop of magnetic tape on which stereophonic music or the like is recorded. A plurality of such cartridges is usually carried in the automobile but without a specific place therefor.

The principal object of my invention is the provision of an automotive stereo cartridge holder which can be mounted beneath the dashboard preferably on the playback unit and which safely stores a plurality of such stereo cartridges together and so that they can be conveniently exchanged individually between the playback unit and such holder. The foregoing object of my invention and its advantages will become apparent during the course of the following description, taken in conjunction with the accompanying drawings, in which FIG. 1 is a perspective view of an automotive stereo cartridge embodying my invention and shown associated with other structure;

FIGS. 2, 4, 5 and 6 are, respectively, side, top plan, front and rear elevational views of said embodiment; and FIGS. 3, 7, 8 and 9 are fragmentary sectional views as indicated.

Referring to the drawings in greater detail said embodiment is designated 10 and comprises top, bottom, side, rear and central dividing walls 25, 30, 32, 34 and 36, respectively. The front, top and bottom portions of the side walls 32 and of the spaced dividing walls 36 are foreshortened in depth in respect to their front center portions to provide maximum visibility and access via finger space for stereo cartridges which are stored as shown for the cartridges 55–57 in FIGS. 1 and 2 in the twin storage compartments formed in the cartridge holder 10. Their front center portions are as long front to back of the cartridge holder as the bottom wall 30 for retaining, via a retainer bar 50, the storage cartridges in said compartments. The entire top wall and the front outside portions of the bottom wall 30 are similarly fore-shortened in depth to enhance such visibility and access to the stored stereo cartridges. The front edges of the dividing walls 36 are closed by a front wall 40 as shown which blends with the top wall 25 and keeps the retainer bar 50 flexed so that it is bowed at its center and tightly in position once its arms 52 are snapped into the retaining means 47, 48 and 49 on the outside of the side walls 32. Each such means 47, 48 and 49 comprises a rearwardly facing ramp having a shoulder 47 extending vertically between top and bottom stops 48 and a rigid holding strap 49 all of which are formed integral with the respective side wall 32. In assembly of the retainer bar 50 to the body of the cartridge holder 10 the arms 52 are inserted into the openings formed by the strap 49 and forced to ride up the ramps until the shoulders 54 on the arms 52 engage the shoulders 47 on the walls 32. Upstanding tabs 44 are formed integrally with the bottom wall 30 and are disposed transversely of the cartridge holder each in front of one of the storage compartments. The tab 44 keeps the lowermost stereo cartridge from moving forwardly out of its storage compartment as shown for the stereo cartridge 55 in FIGS. 1 and 2. The retainer bar 50 keeps the intermediate and uppermost stereo cartridge from the same movement as shown, respectively, for the stereo cartridges 56 and 57 in FIGS. 1 and 2. The retainer bar 50 also divides each compartment so that it has a top opening and a bottom opening between such bar and the top and bottom walls 25 and 30, respectively. In removing a stereo cartridge from its compartment the lowermost one, such as the stereo cartridge 55, is grabbed at its front end and pulled from its compartment through the bottom opening thereof while being lifted over the respective tab 44. The stereo cartridges above, such as the stereo cartridges 56 and 57, drop down as the stereo cartridge 55 is being removed and the intermediate stereo cartridge 56 then assumes the position of the lowermost stereo cartridge. The space 33 between the dividing walls 36 is provided for finger space in handling the stereo cartridges as it provides for a right hand user finger space in removing stereo cartridges from the storage compartment on the left and thumb space in removing stereo cartridges from the right hand storage compartment and vice versa for a left hand user. A stereo cartridge is inserted into its compartment through the top opening thereof in each instance when there is a cartridge already present in the compartment and in most instances when the compartment is empty as it is larger and more convenient for insertion of cartridges than the bottom opening. The labels on the lowermost and uppermost stereo cartridges can be read directly and that on the intermediate stereo cartridge can be read through the retainer bar 50 which is made of transparent plastic.

The cartridge holder 10 is preferably mounted beneath the automobile dashboard, such as the dashboard 18 shown in FIG. 1, and preferably beneath the playback unit carried under such dashboard, such as the playback unit 12 shown in FIG. 1. The mounting bracket 16 for the playback unit 12 is preferably utilized in mounting the cartridge holder 10 and for such purposes brackets 20 and 22 are provided which have upstanding arms provided with slots 21 and 23, respectively, through which fastening bolts, such as the bolt 24, shown in FIG. 1, operate to threadably engage the bracket 16. Horizontal arms on the brackets 20 and 21 are provided with slots 17 and 19, respectively, through which fastening bolts operate to threadably engage nuts (not shown) held against the inside face of the top wall 25 within the storage compartments. By such mounting means the position of the cartridge holder 10 can be adjusted in three directions and made fast in any such adjusted position in respect to the playback unit 12 or other mounting structure.

It will thus be seen that there has been provided by my invention an automotive stereo cartridge holder in which the object hereinabove set forth together with many other thoroughly practical advantages has been successfully achieved. While a preferred embodiment of the invention has been shown and described it is to be understood that variations and changes may be resorted to without departing from the spirit of the invention as defined in the appended claims.

What is claimed is:

1. An automotive stereo cartridge holder for use in an automobile passenger compartment comprising housing means which is closed except at the front thereof whereby to provide a stereo cartridge storage compartment the opening to which is at the front of said housing means, said compartment of depth and width to accommodate a stereo cartridge lying base down and of a height to accommodate several such base down stereo cartridges stacked one on top of another, a retainer bar fast on said housing means disposed horizontally across said front opening to divide the same into a top front opening above said retainer bar through which said stereo cartridges are insertable into said compartment from the front thereof and a bottom front opening below said retainer bar through which said stereo cartridges are removable from said compartment from the front thereof, liftover stop means operative in respect to said bottom front opening preventing movement forwardly out of the front of said compartment of the lowermost stereo cartridge stored therein, and the retainer bar preventing such forward movement of the other stacked stereo cartridges stored in said compartment.

2. An automotive stereo cartridge holder as claimed in claim 1 in which said housing means is equal in depth to the stereo cartridges stored in said compartment at the middle and shorter in depth in respect to cartridges at the top and at the outside bottom thereof for maximum visibility and access via finger space for such cartridges.

3. An automotive stereo cartridge holder for use in an automobile passenger compartment comprising housing means which is closed except at the front thereof whereby to provide a stereo cartridge storage compartment the opening to which is at the front of said housing means, said compartment of depth and width to accommodate a stereo cartridge lying base down and of a height to accommodate several such base down stereo cartridges stacked one on top of another, a retainer bar fast on said housing means disposed across said opening to divide the same into a top opening above said retainer bar through which said stereo cartridges are insertable into said compartment and a bottom opening below said retainer bar through which said stereo cartridges are removable from said compartment, lift-over stop means operative in respect to said bottom opening preventing movement forwardly out of said compartment of the lowermost stereo cartridge, and the retainer bar preventing such movement of the other stacked stereo cartridges stored in said compartment, snap-over fastening means on said retainer bar and said housing means by which the retainer bar snaps into said housing in one direction and means to bow the retainer bar so that it is urged in the opposite direction whereby to enhance the retention via said snap-over fastening means of the retainer bar on said housing.

4. An automotive stereo cartridge holder as claimed in claim 1, said housing providing another stereo cartridge storage compartment which is twin to said compartment, the retainer bar common to the twin storage compartments.

5. An automotive stereo cartridge holder as claimed in claim 4, dividing wall means centrally of the width of said housing means separating the twin storage compartments, said dividing wall means constructed so that there is finger space separating the stereo cartridges stored in one from those in the other of the twin compartments.

6. An automotive stereo cartridge holder as claimed in claim 1, means adjustable along three axes for mounting the cartridge holder in said passenger compartment.

7. An automotive stereo cartridge holder for use in an automobile passenger compartment comprising housing means which is closed except at the front thereof whereby to provide a pair of twin stereo cartridge storage compartments the opening to each of which is at the front of said housing means, each said compartment of depth and width to accommodate a stereo cartridge lying base down and of a height to accommodate several such base down stereo cartridges one above another, dividing wall means centrally of the width of said housing means separating the twin storage compartments, means cooperative with said housing means to prevent movement forwardly out of said compartments of the stereo cartridges stored therein, and means for mounting the cartridge holder in respect to stationary structure in said passenger compartment.

References Cited

UNITED STATES PATENTS

| | | | |
|---|---|---|---|
| 2,223,094 | 11/1940 | Burnette | 312—50 |
| 2,626,194 | 1/1953 | Clower | 108—45 |
| 2,765,906 | 10/1956 | Rossum | 206—44.12 X |
| 2,868,603 | 1/1959 | Wilkenson | 312—42 |
| 2,885,694 | 5/1959 | Ulm | 312—246 X |
| 2,918,342 | 12/1959 | Tarte | 312—330 |

CASMIR A. NUNBERG, *Primary Examiner.*